United States Patent [19]
Arnold

[11] 3,886,653
[45] *June 3, 1975

[54] METHOD AND APPARATUS FOR DEVELOPING AND PLACING ELECTRICAL COILS

[75] Inventor: Richard B. Arnold, Fort Wayne, Ind.

[73] Assignee: General Electric Company, Fort Wayne, Ind.

[ * ] Notice: The portion of the term of this patent subsequent to Mar. 19, 1991, has been disclaimed.

[22] Filed: Feb. 8, 1974

[21] Appl. No.: 440,857

Related U.S. Application Data

[63] Continuation of Ser. No. 237,829, March 24, 1972, Pat. No. 3,797,105.

[52] U.S. Cl. .............. 29/596; 29/205 R; 29/205 D; 29/606; 57/51.2; 57/115; 57/156; 140/92.1
[51] Int. Cl. .......................................... H02k 15/00
[58] Field of Search ............ 29/596, 598, 605, 606, 29/205 R, 205 D; 310/213; 140/92.1, 149; 57/9, 51, 51.2, 55, 106, 115, 117, 118, 156, 166; 174/33, 34; 336/187

[56] References Cited
UNITED STATES PATENTS

| | | | |
|---|---|---|---|
| 2,934,099 | 4/1960 | Mason | 140/92.1 |
| 3,797,105 | 3/1974 | Arnold | 29/596 |

*Primary Examiner*—Carl E. Hall
*Attorney, Agent, or Firm*—Ralph E. Krisher, Jr.

[57] ABSTRACT

Method and apparatus for axially developing electrical coils in selected slots of a magnetic stator core for a dynamoelectric machine. In the exemplified approach, two strands of wire are wound in hand, i.e., wound simultaneously, to generate one or more electrical coils having two or more turns each. Coils are transferred axially into slots of magnetic stator core firmly supported in a predetermined position relative to the coil generation means. Indexing means may also be provided and used to either re-orient the stator core relative to the coil placing means for receipt of other coils or core may be positioned and oriented in a predetermined position relative to a second winding and/or placing means spaced from the first coil placing means. Two or more strands of wire are substantially simultaneously dispensed by flyer means moving in a substantially contant and fixed path about arbor or coil form means that establish a predetermined desired shape for the turns of each coil. As the flyer means moves, the multiple strands of wire tend to twist one upon another. However, along at least two predetermined portions of each coil being developed, the wire strands are prevented from twisting or crossing one upon another. Arbor means have predetermined "no twist" locales adjacent which are located those portions of the coils that are to enter restricted core slot entrances. In the case of generally arcuate divider blades or plates, a recessed or relieved area is provided along a preselected central region of at least selected ones of the divider blades to encourage and accommodate twisting of wire strands while being placed against the divider blades. Recess preferably is of a depth at least equal to twice the diameter of a maximum strand size to be flyer wound. Recess or undercut in each divider blade has divider blade "no twist" locale at each side thereof. The axial extent of the recessed surface is preferably at least approximately as great as the axial length, i.e., stack height of a core with which the apparatus is to be used. As the wire is pulled across a "no twist" locale, relatively high wire tension, i.e., relatively high pressure between the wire and arbor means rather than simple strand tension, occurs and is believed to contribute to the advantageous results. Since the wire strands preferably do not contact undercut regions of the arbor means, no pressure will be exerted therebetween.

5 Claims, 3 Drawing Figures

METHOD AND APPARATUS FOR DEVELOPING AND PLACING ELECTRICAL COILS

CROSS REFERENCE TO RELATED APPLICATION

This application is a continuation application of my co-pending application Ser. No. 237,829 which was filed Mar. 24, 1972 and which issued as U.S. Pat. No. 3,797,105 on Mar. 19, 1974. The entire disclosure of the just referenced patent is specifically incorporated herein by reference.

BACKGROUND OF THE INVENTION

The present invention relates to improved methods and apparatus for developing and placing electrical coils, and more particularly; to improved methods and apparatus for flyer winding two or more wire strands rather than a single strand while developing electrical conductors into coil turns, and for axially inserting such turns into slots of a magnetic core for a dynamoelectric machine.

In recent years, substantial advances have been made in the electrical coil developing and placing art. Examples of this art are: Adamson U.S. Pat. No. 2,432,267; Mason U.S. Pat. No. 2,934,099; and Duff el al U.S. Pat. No. 3,528,170; the latter two of which are assigned to the assignee of the present application.

The above identified as well as other patents (for example, Arnold patent) describe apparatus and methods that may be used to advantage to competitively produce dynamoelectric machines. However, it is difficult, if possible at all, to wind two or more strands of wire simultaneously with many existing machines and methods.

Multiple, for example double, strand coil winding is often one of the more economical approaches for manufacturing certain designs of motors. For example, a desired level of performance for a given motor design may require a wire size larger than is generally available on a competitive cost basis. In cases such as this, it is often more economical to provide winding coil groups formed of two or more strands of parallel connected smaller wires. In other cases, commonly available conductors of a size selected for performance reasons will be too large to be axially inserted through the restricted slot entrances of the selected magnetic core. In order to avoid increasing the size of the slot entrances of the core (which would be costly from a tooling standpoint and which also could reduce the desired magnetic properties of the core), a practical solution again would be to use two or more smaller conductors in parallel connected coils in lieu of a single coil of a larger conductor size.

For some types of equipment, the winding of two or more strands of wire simultaneously may be done with relative ease. For example, when wire is paid from two or more wire spools to a rotating arbor, precision winding and placement of the wire on the arbor may be readily accomplished. However, when flyer type winding approaches are followed, as shown for example in the above identified patents, the wire strands twist one upon another during each revolution of the flyer.

These twists occur in random fashion usually with one twist occurring during each flyer revolution. When these twists are located in the portion of a coil that is to be admitted into the restricted slot openings of the core, the wire bulk is so great that the wire is damaged or broken during insertion into the restricted core slots.

The only approach of which I am aware that would avoid this type of problem with flyer equipment, are those wherein spools or spindles of wire are continuously rotated with the revolving flyer. This approach however is not a desirable one since the location of a wire supply on a member rotatable with the flyer substantially increases the mass that must be rotated. Thus the inertia forces involved upon starting and stopping are increased and flyer or winding speed will be limited.

For these and other reasons, where multiple strand coils have been needed, equipment such as that shown by the above cited Duff et al or Mason patents have been used to wind and place a first coil of a preselected relatively small wire size; and then wind and place one or more additional coils of the same wire size in the same core slots as the first coil. Frequently, it has been necessary to manually place these coils in the core slots. It will be appreciated that this approach also is costly to practice.

Accordingly, it is an object of the present invention to provide improved methods and apparatus for developing, and placing into slots of a magnetic core, electrical coils formed of two or more wire strands that are developed substantially simultaneously by a flyer type winder.

It is a more specific object of the present invention to provide methods and apparatus for developing and placing multiple strand flyer wound coils which would overcome at least some of the difficulties mentioned above.

It is another object of the present invention to provide improved methods and apparatus for developing and axially inserting electrical coils in dynamoelectric machine stator slots in an efficient and economical manner with consistently satisfactory results, even when two or more conductor strands are flyer wound prior to insertion thereof in the slots of a stator core.

SUMMARY OF THE INVENTION

In carrying out the above and other objects in one preferred form, there are provided improved methods and apparatus for axially developing electrical coils in selected slots of a slotted structure, e.g., the slots of a stator core for a dynamoelectric machine. In the exemplified approach, two strands of wire are wound in hand, that is wound simultaneously, to generate one or more electrical coils having two or more turns each. The coils then are transferred axially into selected slots of a stator core which is firmly supported in a predetermined position relative to the coil generation means. This transfer is effected in a known manner and selected portions of the coils are axially inserted into selected slots of the stator core as has been done heretofore. When it is desired to generate two or more coil groups for a given stator core, indexing means may also be provided and used to either re-orient the stator core relative to the coil placing means or, alternatively, conveyor means may be used to position and orient the stator core in a predetermined position relative to a second winding and/or placing means spaced from the first coil placing means.

In the preferred approach, two or more strands of wire are substantially simultaneously dispensed by flyer means that move in a substantially constant and fixed path about means, such as an arbor or coil form, that establish a predetermined desired shape for the turns of each coil. As the flyer means moves, the multiple strands of wire tend to twist one upon another. However, along at least two predetermined portions of each coil being developed, the wire strands are prevented from twisting or crossing one upon another.

Each coil of a coil group is developed in conjunction with different portions of arbor or form means. The arbor means have predetermined no twist locales adjacent which are located those portions of the coils that are to enter restricted core slot entrances. When the coil turn shape determining means include a plurality of generally arcuate divider plates, it is preferred to provide a recess or relieved area along a preselected central region of at least selected ones of the divider blades so as to encourage and accommodate twisting of the wire as it is being placed against the divider blades. The recess preferably will be of a depth at least equal to twice the diameter of a maximum strand size to be formed about the divider blades. The recess or undercut in each divider blade has a divider blade no twist locale at each side thereof. As the flyer means moves about the relieved divider blades, relatively high wire tension is thought to occur as the wire is pulled across the no twist locale as compared to a relatively low tension as the wire is placed in proximity to the recessed or undercut regions of the divider blades.

The subject matter which I regard as my invention is particularly pointed out and distinctly claimed in the concluding portion of the specification. The invention itself, however, both as to organization and method of operation, together with further objects and advantages thereof, may be better understood with reference to the following description taken in conjunction with the accompanying drawing.

DESCRIPTION OF THE PREFERRED EMBODIMENTS

Figure 3:
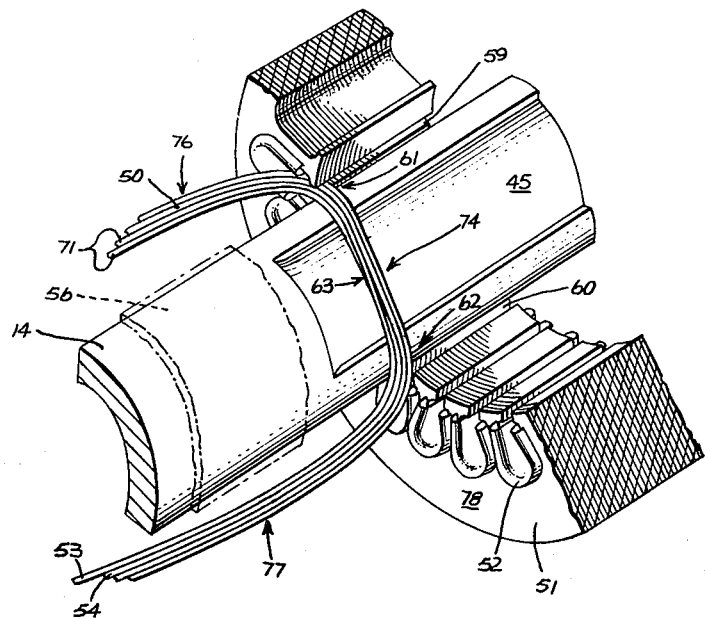
FIG. 3 is an enlarged view, in perspective, with parts broken away, and parts removed, of a divider plate or blade and a pusher plate or blade cooperating to insert a formed coil in the slots of a stator core.
Figure 1:
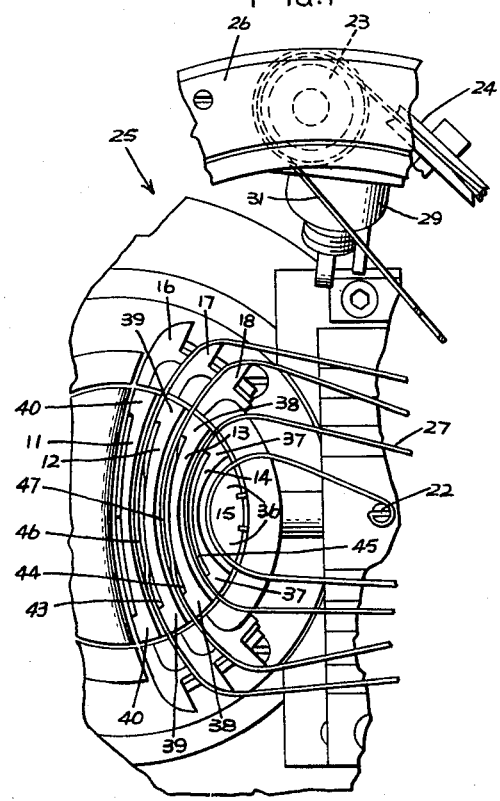
FIG. 1 is an end view looking into an apparatus embodying the invention in one form thereof, the apparatus being useful for practicing the invention, with FIG. 1 showing the relationship of divider blades and a part of a flyer means.
Figure 2:
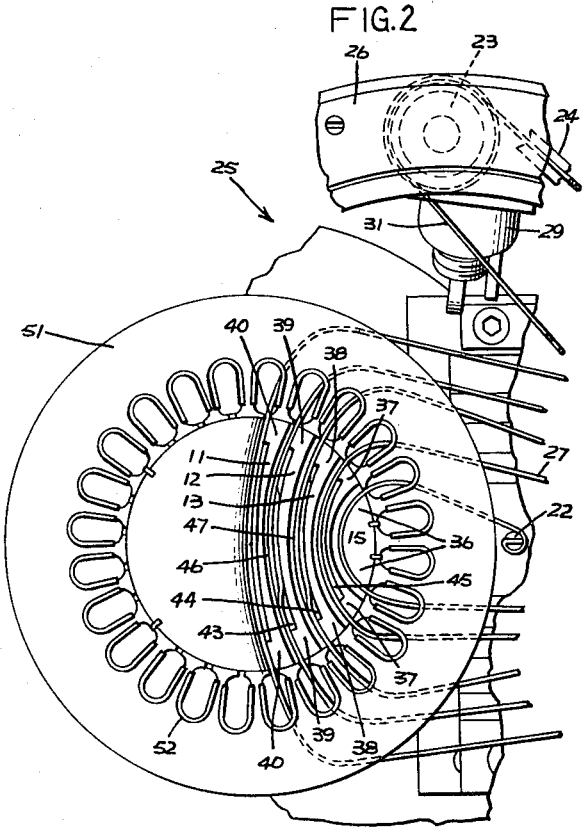
FIG. 2 is a view similar to FIG. 1 but with a portion of a stator core superposed on the structure of FIG. 1.

Now referring to FIGS. 1 – 3 in the drawing, it is to be understood that for simplicity of description, many portions of the complete apparatus that could otherwise be illustrated and specifically described herein have been omitted because a complete and detailed description and analysis of such apparatus is already available in published form. More specifically, such apparatus is shown and described in the above reference Mason U.S. Pat. No. 2,934,099 and Duff et al U.S. Pat. No. 3,528,170. Accordingly, the entire disclosures of said Mason patent and said Duff et al patent are specifically incorporated herein by reference.

The views of the drawing for this application have been made to substantially correspond, to the extent possible, to views in Mason U.S. Pat. No. 2,934,099. More specifically, FIGS. 1 and 2 herein (except for changes made to exemplify the present invention) would find correspondence in FIG. 13 of the Mason patent. FIG. 3 herein (except for changes) would find correspondence in FIG. 21 of the Mason patent.

With specific reference now to FIG. 2, apparatus embodying the invention and exemplifying one form of practicing the invention includes means for determining the general size or configuration of successively developed winding turns. This means comprises arbor or form means that include, inter alia, a plurality of curved movable divider elements 11, 12, 13, 14, and 15. These elements also have been variously called in the art "plates" or "blades". Also included are parts 16, 17 and 18 which may optionally be provided and used to help form coil turns of a desired span. The elements 11–15 are movable by the same general type mechanism and in the same general fashion as described in the referenced Mason U.S. Pat. No. 2,934,099 and Duff et al U.S. Pat. No. 3,528,170.

Coil turn shape determining means also includes arbors or posts that may be used for the same purpose as the radially retractable wire receivers of the referenced Mason patent. Alternatively, these parts may be similar to the stepped form portions shown in the Duff et al patent. In operation, the ends 21 of two wire strands will be clamped or otherwise held by a member 22. Initially, the wire strands will extend from member 22 radially toward and around pulley 23 of a flyer and thence to a guide or pulley 24 of the flyer. The strands then extend along a suitable guide or tube to tensioning means and a pair of not shown supply spools or drums.

Upon energization of the apparatus 25, the flyer will rotate within the generally circular housing 26 (see FIGS. 1 and 2) and wrap the multiple strands of wire as winding turns about the element 15 and the first stage or step of the not shown portion of the winding form means. After a predetermined number of multistranded turns have been generated about element 15, the flyer is advanced to a point where the winding turns generally denoted by the reference numeral 27 are stepped onto blade 14. This operation continues, with a desired number of turns being developed about each of the elements 11 through 15. After a predetermined number of winding turns have been developed about the last or largest element 15 of the form means, the flyer will stop with the pulley 23 thereof in approximately the position shown in FIG. 2. A cutting device 29 is then operated as taught by Mason U.S. Pat. No. 2,934,099 and Duff et al U.S. Pat. No. 3,528,170 to sever the wire strands 31.

At this point it should be expressly noted, that while the above description has assumed traversal of the flyer axially along the winding form means, the flyer could remain stationary with the arbor being advanced axially relative to the flyer. Also, the turns 27 about each blade may be any desired number, as will be understood.

During each revolution of the flyer, the wire strands will twist one upon another in random fashion. Accordingly, the pulley 23 and guide 24 as well as any other guide elements associated with the apparatus will be dimensioned and proportioned to accommodate a pair of twisted wires each having the maximum dimension comtemplated. For example, a pulley with a groove width of about 0.060 of an inch, designed to accommodate one strand of 0.0539 of an inch wire, will have its groove width increased to about 0.080 of an inch to accommodate two strands of 0.038 of an inch wire that is used in lieu of one strand of the larger wire. Of course, if three strands were to be wound rather than two, these same elements and guides would be so proportioned and dimensioned to accept and accommodate a twist involving three strands of wire having the maximum contemplated diameter.

Generally speaking, problems would not be encountered during insertion of coils into stator slots if the twists of wire would always occur anywhere other than the regions denoted by the reference numerals 36 through 40. This point will be further discussed in connection with FIGS. 2 and 3 but it is now noted that the regions 36 through 40 denote those portions of the form means about which the turns are developed which will form the leading portions of each wire turn bundle or coil as it is being moved into and along the restricted entrance of core slots. Thus, it is extremely desirable that the wire strands in each coil turn be positioned in a precision manner along the regions 36 through 40 of the blades 11–15. Moreover, any twisting or crossing of strands should not occur in the regions 36 through 40, which regions are referred to herein as no twist or "precision winding" locales.

I have found that heretofore, when attempts were made to flyer wind multiple strands of wires, e.g., two in hand, twisting of the two wires would occur in random fashion during each flyer revolution in the Mason and in the Duff el al apparatus. This twist still occurs with the apparatus shown herein but is now constrained from occurring adjacent the no twist locales 36 through 40.

It is believed that this desirable result is achieved because the strands are in relatively high tension as they are placed along the no twist locales 36 through 40. Moreover, it is believed that even though a twist may be about to occur as the wire is being pulled across the no twist locales by the flyer, the tension in the wire strands is sufficiently great to prevent the strands from crossing one another until after the strands have been precisely layered along the no twist locales. This result is insured by the provision of relieved or recessed regions 42, 43, 44 and 45 in the divider blades. The depth of these relieved or recessed areas is at least equal to the diameter of the maximum size of wire to be wound by the flyer multiplied by number of strands that are to be simultaneously wound.

It will be noted from FIG. 1 that I have shown at 46 and 47 a twist or crossover adjacent the relieved regions 43, 44. This is not meant to imply, however, that every turn developed about blades 11 and 12 will exhibit a twist in the vicinity of the recessed portions of those blades. Nor should the drawing be interpreted to imply that no twist occurs in the recessed areas of the divider blades 13 and 14. Thus, FIG. 1 has been made to emphasize the fact that if a twist should occur adjacent the divider blades 11 through 14 rather than adjacent the not shown portions of the form means, such twist will occur within the recessed or relieved areas of the blades rather than along the no twist locales.

It will be noted that a relieved or recessed portion has not been provided on the divider blade or element 15. Such an area has been omitted because, in practice, the twist has not been observed to occur along element 15. It is believed that this is due to the relatively small radius of the element 15 which apparently results in a relatively high strand tension as coil turns are wrapped about the element 15. If the size and dimensions of the tooling, i.e., blades 11 through 15 were changed so that the curvature of blade 15 was substantially reduced, it is believed that it would then be necessary to also provide relieved areas in the blade 15 to establish preselected twist areas for blade 15.

FIG. 2 shows an overlay of a stator core 51 on the structure and parts shown in FIG. 1. From FIG. 2 the predetermined relationship of core slot entrances relative to the divider blades and coils of wire supported thereon will be appreciated. Also, it is again emphasized, that the wire turns 27 represent a plurality of multistranded winding turns, i.e., coils that have been formed partly about the blades 11 through 15 and partly about the not shown other part of the winding form or arbor.

In FIG. 3, I have shown part of the stator core 51, with slot liners or other suitable insulation 52 carried thereby. Also shown is the divider blade 14; a coil 50 comprised of a plurality of wire strands 53, 54, etc.; and a stripper or pusher plate 56. Substantial portions of the apparatus 25, including parts of the blade 14 and plate 56 have been broken away for clarity. However, FIG. 3 clearly reveals how the portions of the coil 50 that have been developed adjacent the no twist locales 57, 58 of blade 14 are inserted into the restricted slot entrances 59, 60 of the core 51. It will be appreciated from FIG. 3 that if the strands of wire in the coil portions 61, 62 were twisted one upon another as has occurred for example at 63, the wires would in most cases be damaged during insertion into the slots 59, 60. Although blade extensions have not been shown in any of FIGS. 1 through 3, it will be appreciated that blade extensions (as clearly revealed in FIG. 4 of the Duff et al patent and described in detail therein) could be used to advantage with apparatus embodying my invention.

In summary, the apparatus embodying my invention includes winding turn formation means that comprises a flyer and associated parts having wire passages and guiding means proportioned and dimensioned to accept a preselected multiple number of strands of wire. It will now be understood that as used herein, multiple number of strands or multistrand means at least two strands of wire. The winding turn formation means also includes arbor or form means such as the illustrated blade elements 11 through 14, at least preselected ones of which are provided with no twist locales. As above mentioned, precision layering of winding material will be obtained adjacent the no twist locales of the form means. Low tension regions, on the other hand, located between the no twist locales, provide twist inducing regions for the blades 11–14.

In the case of the generally arcuate illustrated parts 11, 12, 13, 14, the recess or undercut in each divider blade preferably will be of a depth at least equal to twice the diameter of a maximum strand size to be wound by the flyer. The arcuate length of each no twist locale is not critical, and may be made to be, for example, about one quarter of an inch. The axial extent of the recessed surface is preferably at least approximately as great as the axial length, i.e., stack height of a core with which the apparatus is to be used.

As the wire is pulled across a no twist locale, relatively high wire tension (i.e., relatively high pressure between the wire and arbor means rather than simple strand tension) is believed to contribute to the advantageous results. Since the wire strands preferably do not contact undercut regions of the arbor means, no pressure will be exerted therebetween.

Methods exemplifying the invention include generating a plurality of multistranded turns about turn establishing means so as to form one or more coils in a coil group. More specifically, I develop a plurality of differently sized electrical coils each formed of a number of multistrand conductor turns generated by a flyer that is revolved about winding turn establishing means. While developing the coils from multiple strands of conductive wire material, the strands are constrained from twisting or crossing over one another in predetermined portions of each coil. These predetermined portions of the coils are then subsequently admitted to the restricted slot entrances of the magnetic core.

With reference again to FIG. 3, the twisting or overlapping of the strands such as strands 53, 54 (which together form one coil turn 71) at the region 63 will no longer be observed to occur in a completely random fashion within each coil, since twisting of one wire strand over another will not be observed in the portions 61 and 62 of the finished coils. Thus, twists will occur in random fashion only in the coil end portions 74, side turn portions 76 or 77, or the not shown trailing end turn portion of the coils that subsequently will be positioned adjacent the face 78 of the core 51.

From the foregoing, it will be apparent that the present invention provides a number of advantages. Moreover, the invention may be practiced when developing and placing either single or multi-phase motor windings. The opportunity for multistrand coil turn damage during insertion after being developed by a flyer type winder is greatly reduced if not entirely eliminated. Moreover, apparatus and methods of practicing the invention are versatile in nature and may be modified in many ways. For example, the direction of relative axial movement between the arbor means and flyer may be in the direction as described above or in the opposite axial direction. Also, the invention may among other things be utilized with electrical conductors of different sizes, and material; or might be practiced with types of coil generating equipment other than that shown, for example, with types of equipment as shown in my U.S. Pat. No. 3,579,791; Arnold et al U.S. Pat. No. 3,579,818; or Smith U.S. Pat. No. 3,514,837.

It should be apparent to those skilled in the art that while I have shown and described what at present are considered to be preferred exemplifications of my invention in accordance with the Patent Statutes, modifications may be made therein without actually departing from the true spirit and scope of the invention. I therefore intend to cover in the following claims all such equivalent variations as fall within the invention.

What I claim as new and desire to secure by Letters Patent of the United States is:

1. A method for developing at least one electrical coil formed of at least two independent strands of conductive wire material, and placing side turn portions of the at least one electrical coil in slots of a magnetic core, the coil having side turn portions adapted to be accommodated in selected magnetic core slots and having predetermined portions for moving adjacent the entrances of magnetic core slots; the method comprising the steps of: disposing at least two independent strands of conductive wire material substantially simultaneously about winding turn size determining means by moving winding turn developing means about the winding turn size determining means, constraining the at least two independent strands of substantially simultaneously disposed conductive wire material from crossing one over another in either of at least two predetermined portions of the at least one coil; and moving the at least two predetermined portions of the at least one electrical coil along the entrances of preselected slots of the magnetic core.

2. The method of claim 1 further including the at least two independent strands to be crossed one over another in a third predetermined portion of the at least one coil.

3. Apparatus for forming winding turns and inserting portions of the winding turns in slot of a magnetic core, the apparatus having winding turn formation means for use in developing at least one coil wound from a plurality of independent strands of conductor wire by the substantially simultaneous development of the plurality of independent strands as winding turns about at least part of said winding turn formation means; said winding turn formation means including a movable conductor wire dispensing mechanism and winding turn size determining means; said winding turn size determining means including form means having at least two spaced apart no twist locales and at least one twist inducing region, whereby the plurality of independent strands of conductor wire may be constrained from crossing one over another adjacent the no twist locales of the form means; said apparatus further including means for moving portions of winding turns along the form means and along the slots of a magnetic core.

4. Apparatus for developing at least one coil from a plurality of independent strands of conductive material and for placing portions of the at least one coil slots of a magnetic core, the apparatus comprising winding turn formation means having at least two spaced apart locales for accommodating precision layered strands of conductive material; means for substantially simultaneously dispensing at least two independent strands for conductive material about said spaced apart locales, the at least two spaced apart locales of said winding turn formation means each being located adjacent to a preselected region adapted to accommodate a twist in the independent strands of conductive material; and means for causing relative movement of the precision layered strands of conductive material and slots of a magnetic core, and moving portions of the strands of conductive material into slots of a magnetic core.

5. The apparatus of claim 4 wherein the at least two spaced apart locales are established by curved surfaces of a first member and the preselected region is determined by a relieved surface of said first member.

* * * * *